(12) United States Patent
Carroll

(10) Patent No.: US 11,909,753 B2
(45) Date of Patent: *Feb. 20, 2024

(54) VIRTUAL PRIVATE CLOUD FLOW LOG EVENT FINGERPRINTING AND AGGREGATION

(71) Applicant: Capital One Services, LLC, McLean, VA (US)

(72) Inventor: Seth Patrick Carroll, Murphy, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/070,137

(22) Filed: Nov. 28, 2022

(65) Prior Publication Data

US 2023/0085654 A1 Mar. 23, 2023

Related U.S. Application Data

(63) Continuation of application No. 16/989,357, filed on Aug. 10, 2020, now Pat. No. 11,522,893, which is a (Continued)

(51) Int. Cl.
| | |
|---|---|
| *H04L 9/40* | (2022.01) |
| *G06F 16/17* | (2019.01) |
| *H04L 43/062* | (2022.01) |
| *H04L 12/46* | (2006.01) |
| *H04L 43/04* | (2022.01) |

(52) U.S. Cl.
CPC ...... *H04L 63/1425* (2013.01); *G06F 16/1734* (2019.01); *H04L 12/4641* (2013.01); *H04L 43/04* (2013.01); *H04L 43/062* (2013.01); *H04L 63/1416* (2013.01)

(58) Field of Classification Search
CPC . H04L 63/1425; H04L 12/4641; H04L 43/04; H04L 43/062; H04L 63/1416; H04L 12/4625; H04L 43/026; H04L 43/0823; G06F 16/1734; G06F 16/188
See application file for complete search history.

(56) References Cited

U.S. PATENT DOCUMENTS 7,610,624 B1 * 10/2009 Brothers ............. H04L 63/1425 709/224
7,908,655 B1 * 3/2011 Bhattacharyya .... H04L 63/1475 370/396

(Continued)

*Primary Examiner* — Aravind K Moorthy
(74) *Attorney, Agent, or Firm* — KDW Firm PLLC

(57) ABSTRACT

Techniques for fingerprinting and aggregating a virtual private cloud (VPC) flow log stream are provided. Each VPC flow log event in the VPC flow log is first determined to be a request event or a response event. A fingerprint is then generated for each VPC flow log event. The fingerprint for a VPC flow log event is generated based on the determination whether the VPC flow log event is a request event or a response event and by concatenating and encoding data contained in a set of data fields corresponding to the VPC flow log event. Based on the fingerprint generated for each VPC flow log event, related events can be detected and aggregated to form an aggregated event. Information stored with each aggregated event can then be used to better monitor the VPC.

20 Claims, 8 Drawing Sheets

Related U.S. Application Data continuation of application No. 16/406,397, filed on May 8, 2019, now Pat. No. 10,764,315.

(56) References Cited

U.S. PATENT DOCUMENTS

| | | | | |
|---|---|---|---|---|
| 8,452,901 B1* | 5/2013 | Sandstrom | | G06F 11/079 |
| | | | | 710/39 |
| 8,644,173 B1* | 2/2014 | McMullen | | H04L 43/16 |
| | | | | 370/252 |
| 8,904,530 B2* | 12/2014 | Liu | | H04L 63/1416 |
| | | | | 709/224 |
| 9,112,919 B1* | 8/2015 | Vinapamula Venkata | | |
| | | | | H04L 61/256 |
| 9,479,405 B1* | 10/2016 | Tongaonkar | | H04L 43/04 |
| 9,842,017 B1* | 12/2017 | Zhang | | G06F 11/079 |
| 9,912,767 B1* | 3/2018 | Weald | | G06Q 30/0241 |
| 10,114,553 B2* | 10/2018 | Li | | G06F 3/0659 |
| 10,298,598 B1* | 5/2019 | Mcclintock | | H04L 63/1483 |
| 10,445,219 B1* | 10/2019 | Roy | | G06F 11/3656 |
| 10,594,399 B2* | 3/2020 | Ping | | H04B 10/27 |
| 10,764,315 B1* | 9/2020 | Carroll | | H04L 63/1425 |
| 11,037,195 B1* | 6/2021 | Puri | | G06Q 30/0255 |
| 11,522,893 B2* | 12/2022 | Carroll | | H04L 43/04 |
| 2005/0063370 A1* | 3/2005 | Beshai | | H04Q 11/0005 |
| | | | | 370/360 |
| 2005/0210159 A1* | 9/2005 | Voorhees | | G06F 13/387 |
| | | | | 710/5 |
| 2006/0013294 A1* | 1/2006 | Regnier | | H04B 17/0087 |
| | | | | 714/E11.2 |
| 2006/0140127 A1* | 6/2006 | Lee | | H04L 63/1441 |
| | | | | 370/389 |
| 2006/0294588 A1* | 12/2006 | Lahann | | G06F 21/56 |
| | | | | 726/11 |
| 2007/0074288 A1* | 3/2007 | Chang | | H04L 43/028 |
| | | | | 726/22 |
| 2008/0147944 A1* | 6/2008 | Sonntag | | G06F 13/362 |
| | | | | 710/240 |
| 2008/0201547 A1* | 8/2008 | Atherton | | G06F 12/0284 |
| | | | | 711/170 |
| 2009/0110399 A1* | 4/2009 | Aihara | | H04L 41/0681 |
| | | | | 398/66 |
| 2009/0182854 A1* | 7/2009 | Sun | | H04L 49/351 |
| | | | | 709/223 |
| 2009/0319758 A1* | 12/2009 | Kimura | | G06F 9/3851 |
| | | | | 712/E9.001 |
| 2010/0023652 A1* | 1/2010 | Kono | | G06F 3/0604 |
| | | | | 711/E12.001 |
| 2010/0260146 A1* | 10/2010 | Lu | | H04L 12/4633 |
| | | | | 455/432.1 |
| 2012/0300650 A1* | 11/2012 | Claudius | | H04L 61/2532 |
| | | | | 370/252 |
| 2013/0036469 A1* | 2/2013 | Worth | | H04L 63/1408 |
| | | | | 726/23 |
| 2013/0100859 A1* | 4/2013 | Martin | | H04M 15/48 |
| | | | | 370/259 |
| 2015/0096032 A1* | 4/2015 | Hay | | G06F 21/577 |
| | | | | 726/25 |
| 2016/0078332 A1* | 3/2016 | Omodaka | | G06K 15/1806 |
| | | | | 358/1.14 |
| 2016/0226797 A1* | 8/2016 | Aravinthan | | H04L 49/252 |
| 2016/0269250 A1* | 9/2016 | Astigarraga | | H04L 41/0803 |
| 2017/0063889 A1* | 3/2017 | Muddu | | H04L 43/045 |
| 2017/0091038 A1* | 3/2017 | Whitner | | G06F 11/2097 |
| 2017/0344256 A1* | 11/2017 | Gnedin | | G06F 40/134 |
| 2018/0091496 A1* | 3/2018 | Junio | | H04L 61/4541 |
| 2018/0165173 A1* | 6/2018 | Lin | | G06F 16/285 |
| 2018/0278637 A1* | 9/2018 | Kuperman | | H04L 12/2834 |
| 2018/0316704 A1* | 11/2018 | Joseph Durairaj | ... | H04L 41/142 |
| 2019/0081899 A1* | 3/2019 | Mundkur | | H04L 47/34 |
| 2019/0238569 A1* | 8/2019 | Nandy | | H04L 63/0227 |
| 2019/0334836 A1* | 10/2019 | Ajima | | H04L 49/254 |
| 2020/0014713 A1* | 1/2020 | Paul | | H04L 41/0681 |
| 2020/0059491 A1* | 2/2020 | Nukala | | H04L 63/0227 |
| 2020/0304289 A1* | 9/2020 | Androulaki | | G06F 21/6245 |
| 2020/0344247 A1* | 10/2020 | Fleming | | G06F 11/1464 |

* cited by examiner

| Logic Table 200 | Source Port 202 | |
|---|---|---|
| | Low | High |
| Destination Port 204 — Low | compare | Request |
| Destination Port 204 — High | Response | compare |

FIG. 2

| | interface | src_ip | src_port | dst_ip | dst_port | protocol | action | bytes | message_type | fingerprint |
|---|---|---|---|---|---|---|---|---|---|---|
| Request 1 | en1-03219858 | 10.34.49.220 | 46029 | 10.203.3.188 | 443 | TCP | ACCEPT | 25 | request | bHqNm52GFdJ1+fbxilfv== |
| Response 1 | en1-03219858 | 10.203.3.188 | 443 | 10.34.49.220 | 46029 | TCP | ACCEPT | 248 | response | tpm6xpM1R0vdydxHN+iyl/v== |
| Request 2 | en1-03219858 | 10.34.49.220 | 46221 | 10.203.3.188 | 443 | TCP | ACCEPT | 25 | request | bHqNm52GFdJ1+fbxilfv== |
| Response 2 | en1-03219858 | 10.203.3.188 | 443 | 10.34.49.220 | 46221 | TCP | ACCEPT | 312 | response | tpm6xpM1R0vdydxHN+iyl/v== |
| Request 3 | en1-03219858 | 10.34.49.220 | 38799 | 10.203.3.188 | 443 | TCP | ACCEPT | 25 | request | bHqNm52GFdJ1+fbxilfv== |
| Response 3 | en1-03219858 | 10.203.3.188 | 443 | 10.34.49.320 | 38799 | TCP | ACCEPT | 452 | response | tpm6xpM1R0vdydxHN+iyl/v== |

FIG. 3

| | 302 | 304 | 306 | 308 | 310 | 312 | 314 | 402 | 404 | 318 | 320 |
|---|---|---|---|---|---|---|---|---|---|---|---|
| | interface | src.ip | src.port | dst.ip | dst.port | protocol | action | bytes | count | message_type | fingerprint |
| 406-1 Request | eni-03248858 | 10.34.48.220 | 38799 | 10.202.3.188 | 443 | TCP | ACCEPT | 75 | 3 | request | bf/4pNmf52cF0J14fduiliv== |
| 406-2 Response | eni-03248858 | 10.202.3.188 | 443 | 10.34.48.220 | 38799 | TCP | ACCEPT | 1012 | 3 | response | tom5qjM1Rc>vdyxHN+iyVv== |

Storage Medium 600

Computer Executable Instructions for 500

FIG. 6

VIRTUAL PRIVATE CLOUD FLOW LOG EVENT FINGERPRINTING AND AGGREGATION

RELATED APPLICATIONS

This application is a continuation of U.S. patent application Ser. No. 16/989,357, filed Aug. 10, 2020, which is a continuation of U.S. patent application Ser. No. 16/406,397, filed May 8, 2019, titled "VIRTUAL PRIVATE CLOUD FLOW LOG EVENT FINGERPRINTING AND AGGREGATION". The contents of the aforementioned application are incorporated herein by reference in their entirety.

TECHNICAL FIELD

Embodiments described herein generally relate to monitoring of computer networks.

BACKGROUND

For many conventional systems that monitor virtual private cloud (VPC) flow log streams, related or duplicative network events are not recognized. As a result, over a short monitoring time interval, a large number of events records are generated, without any linking to related or duplicative events. The large number of generated records can be cumbersome to interact with in order to better understand network traffic flows and/or for detecting abnormal operations of the network. Accordingly, what is needed is a way to detect and aggregate related events over a monitoring time interval to reduce the number of stored records while retaining important event information, thereby facilitating improved monitoring of the operation of the VPC.

SUMMARY OF THE DISCLOSURE

This disclosure presents various systems, components, and methods related to monitoring computer networks. Each of the systems, components, and methods disclosed herein provides one or more advantages over conventional systems, components, and methods.

Various embodiments include techniques for fingerprinting and aggregating a virtual private cloud (VPC) flow log stream. Each VPC flow log event in the VPC flow log is first determined to be a request event or a response event. A fingerprint is then generated for each VPC flow log event. The fingerprint is generated based on the determination whether a VPC flow log event is a request event or a response event and by concatenating and encoding data contained in a set of data fields corresponding to the VPC flow log event. Based on the fingerprint generated for each VPC flow log event, related events can be detected and aggregated to form an aggregated event. Information stored with each aggregated event can then be used to better monitor the VPC.

By fingerprinting each VPC flow log event, related events can be determined within a desired aggregation window. Information regarding the detected related events can then be assimilated to provide a more manageable number of event records, thereby allowing more efficient monitoring of the VPC. Other embodiments are also disclosed and described.

BRIEF DESCRIPTION OF THE DRAWINGS

FIG. 2 illustrates a logic table implemented by a component of the data processing arrangement of FIG. 1.
FIG. 3 illustrates a first data table.
FIG. 4 illustrates a second data table.
FIG. 6 illustrates a storage medium.

DETAILED DESCRIPTION

Figure 1:
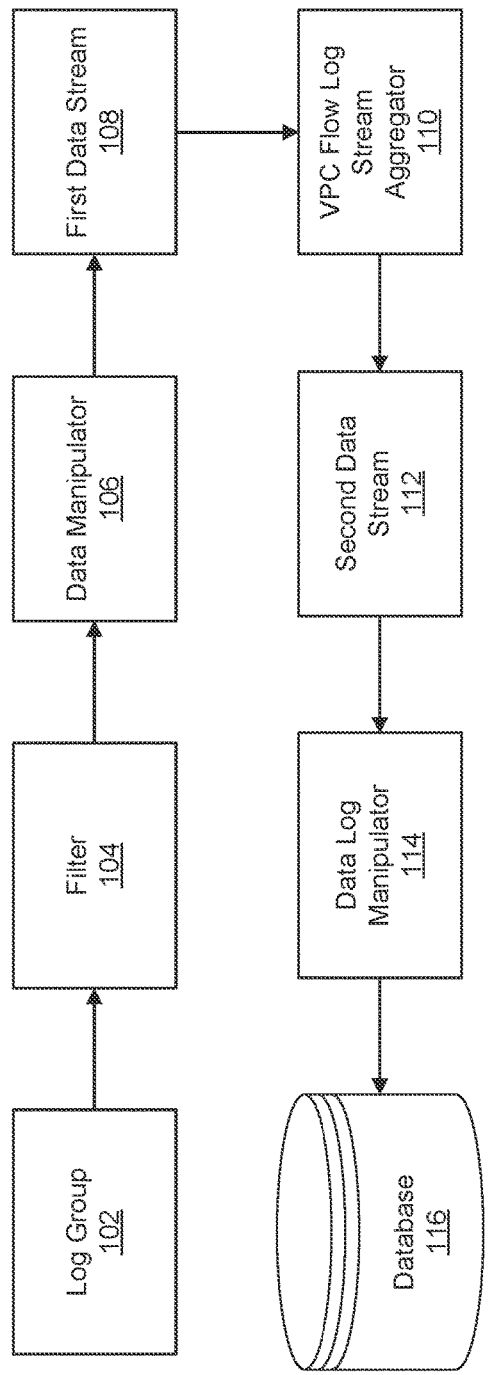
FIG. 1 illustrates a data processing arrangement.

FIG. 1 illustrates a data processing arrangement 100 such as may be representative of various embodiments in which techniques for fingerprinting and aggregating a virtual private cloud (VPC) flow log stream may be implemented. The data processing arrangement 100 can include a log group 102, a filter 104, a data manipulator 106, a first data stream 108, a VPC flow log stream aggregator 110, a second data stream 112, a data log manipulator 114, and a database 116. The data processing arrangement 100 can also be considered to be a data flow arrangement and/or a data monitoring arrangement.

The log group 102 can represent a set of VPC flow logs or data records of communication traffic going to and from network interfaces in a VPC. In various embodiments, the communication traffic can include request events or messages and response events or messages. The filter 104 can be a subscription filter that directs a subset of the VPC flow logs and/or a subset of the data provided by the VPC flow logs from the log group 102 to the data manipulator 106.

The data manipulator 106 can generate the first data stream 108. In various embodiments, the first data stream 108 can be a Kinesis Data Streams (KDS). In various embodiments, the data manipulator 106 can be an Amazon Web Service (AWS) Lambda function. The first data stream 108 can include data regarding the request or response events of VPC communication traffic. The data for each event can include multiple different fields of data as described herein.

The VPC flow log stream aggregator 110 can receive the first data stream 108. The VPC flow log stream aggregator 110 can aggregate events over a predetermined time period (e.g., a one (1) minute time interval). The VPC flow log stream aggregator 110 can then generate the second data stream 112 based on the performed aggregation. In various embodiments, the second data stream 112 can be an output KDS.

The second data stream 112 can be provided to the data log manipulator 114. The data log manipulator 114 can be a tool or application for collecting, parsing, manipulating, and/or storing logs of data—for example, logs of data within the second data stream 112. In various embodiments, the data log manipulator 114 can be Logstash. Logs of data that can be manipulated by the data log manipulator 114 can be stored in the database 116. In various embodiments, the database 116 can be and/or can include Elasticsearch.

The VPC flow log stream aggregator 110 can be configured to operate based on knowledge or assumption that the VPC flow logs of communication traffic can include many related or repeated network calls—for example, related or repeated messages that are either request messages (or events) or response messages (or events). Further, the VPC flow log stream aggregator 110 can be configured to operate such that within a predetermined or predefined time period, aggregation of an event count and message size count (e.g., in bytes) can be performed on such related network calls to provide a consolidated and more user-friendly summary of the VPC flow logs of communication traffic for the predetermined time period.

As a first step toward aggregating related events within the VPC data flow log stream, the VPC flow log stream aggregator 110 can determine a message or event type for each VPC data flow log event within a VPC data flow log. The VPC data flow log can include records, data, or other information on communication traffic—referred to herein as VPC data flow log events—provided over a preselected time interval (e.g., one (1) minute). The VPC data flow log provided to the VPC flow log stream aggregator 110 from the kinesis stream 108 does not include any information regarding message or event type. Accordingly, such a determination—for example, whether a particular VPC data flow log event is a request event or a response event—can be made by the VPC flow log stream aggregator 110.

In various embodiments, the VPC flow log stream aggregator 110 can determine an event type for each VPC data flow log event based on a value of a source port and a value of a destination port. The Internet Assigned Numbers Authority (IANA) suggests a source port in the range of 49152 to 65535 for a request event. Further, most Linux kernels dynamically assign a source port in a range of 32768 to 6100 for a request event. In various embodiments, the VPC flow log stream aggregator 110 can determine the event type for a VPC data flow log event using 32768 as a predetermined threshold.

For example, for a VPC data flow log event, if the source port has a value that is above the predetermined threshold and the destination port has a value that is below the predetermined threshold, then the VPC flow log stream aggregator 110 can determine the VPC data flow log event is a request event or message. If the source port has a value that is below the predetermined threshold and the destination port has a value that is above the predetermined threshold, then the VPC flow log stream aggregator 110 can determine the VPC data flow log event is a response event or message.

For situations where both the source port and the destination port are above the predetermined threshold, then the VPC flow log stream aggregator 110 can compare the source port to the destination port. If the source port value is larger than the destination port value, then the VPC flow log stream aggregator 110 can determine the VPC data flow log event is a request event or message. If the source port value is smaller than the destination port value, then the VPC flow log stream aggregator 110 can determine the VPC data flow log event is a response event or message.

For situations where both the source port and the destination port are below the predetermined threshold, then the VPC flow log stream aggregator 110 can compare the source port to the destination port. If the source port value is larger than the destination port value, then the VPC flow log stream aggregator 110 can determine the VPC data flow log event is a request event or message. If the source port value is smaller than the destination port value, then the VPC flow log stream aggregator 110 can determine the VPC data flow log event is a response event or message.

FIG. 2 illustrates a logic table 200 implemented by the VPC flow log stream aggregator 110. As shown, the logic table 200 compares a source port 202 to a destination port 204 for a VPC data flow log event for a given predetermined threshold such as, for example, 32678. When the source port 202 has a high value (e.g., above 32678) and the destination port 204 has a low value (e.g., below 32678), then the VPC flow log stream aggregator 110 can determine that the VPC data flow log event is a request event. When the source port 202 has a low value (e.g., below 32678) and the destination port 204 has a high value (e.g., above 32678), then the VPC flow log stream aggregator 110 can determine that the VPC data flow log event is a response event.

For other situations—for example, when the source port 202 and the destination port 204 have values above the predetermined threshold or when the source port 202 and the destination port 204 have values below the predetermined threshold—then the VPC flow log stream aggregator 110 can compare the source port 202 to the destination port 204. When the source port 202 is larger than the destination port, the VPC flow log stream aggregator 110 can determine the VPC data flow log event is a request event. Alternatively, when the source port 202 is smaller than the destination port, the VPC flow log stream aggregator 110 can determine the VPC data flow log event is a response event.

After determining the message or event type for a VPC data flow log event within a VPC data flow log, the VPC flow log stream aggregator 110 can generate a fingerprint for each VPC data flow log event. The fingerprint can be an identifier for the VPC data flow log event. The fingerprint can be generated based on a combination of identifying data fields of the VPC data flow log event. The generated fingerprint can then be used to identify repeated or related events. In various embodiments, repeated or related events can generate the same fingerprint. Accordingly, information associated with the identified repeated or related events can then be aggregated and/or collapsed to provide a concise summary of all of the VPC data flow log events within the VPC data flow log, for a given aggregation time period or window.

In various embodiments, the identifying fields for the VPC data log flow event can depend on the determined type of event. Further, the identifying fields used to generate the fingerprint can exclude a dynamic (e.g., ephemeral) source port for a determined request message and can exclude a dynamic (e.g., ephemeral) destination port for a determined response message. Accordingly, under either determined message type, the dynamic (e.g., non-fixed) field port of the VPC data log flow event can be ignored or excluded.

In various embodiments, the following identifying fields of a VPC data log flow event can be used to generate a fingerprint:

Interface—for example, an identifier for a network and/or client interface (e.g., a network interface identifier or a client interface identifier)

Source IP address ("src.ip"; e.g., source address)

Destination IP address ("dst.ip"; e.g., destination address)

Source port ("src.port")—only if the determined message type is a response

Destination port ("dst.port")—only if the determined message type is a request

Protocol—for example, an indication of a communication protocol such as TCP (e.g., communication protocol identifier)

Action—for example, an indication of an activity such as acceptance of a request (e.g., action identifier)

In various embodiments, the selected identifying fields of the VPC data log flow event can be concatenated. The concatenated fields can then be encoded. In various embodiments, an MD5 hash can be generated based on the concatenated fields and then Base64 encoded, resulting in the fingerprint. The generated fingerprint can then be stored—for example, within the event as a top level attribute.

Subsequent VPC data log flow events can then be parsed and reviewed—with an event type determined and a fingerprint generated. For VPC data flow log events having matching fingerprints, an event count stored with the fingerprint can be incremented (e.g., by one (1)) and a message size (e.g., byte count) can be incremented (e.g., by a size of the event in bytes). In various embodiments, the generated fingerprint can be generated and compared to any prior stored fingerprints. If the fingerprint is already stored, then the event count can be incremented, and the message size can be incremented based on the size of the message. A timestamp for the most recent detected related or repeated event (e.g., an event having the same fingerprint) can also be stored with the fingerprint.

In various embodiments, the VPC flow log stream aggregator 110 can store information related to VPC data log flow events—for example, into an in-memory Python dictionary with the fingerprint for an event as the key. As the VPC flow log stream aggregator 110 detects duplicate or related events (e.g., that generate the same fingerprint), an event counter can be incremented, and a total count of bytes can be summed. An event counter and a byte total can be stored in a record or log for each unique fingerprint. Further, the dynamic port of the event can be overwritten for each subsequent duplicate or related event that occurs within the aggregation window.

FIG. 3 illustrates a data table 300 that can be associated with various events such as VPC data log flow events. The data table 300 can be representative of an exemplary process: client A makes three requests to server B on port 443 over a short period of time and server B responds to client A. The client's kernel can generate a dynamic (ephemeral) source port for each of the requests, and the server responds to the dynamic port. Data table 300 and the example process shown therein has been simplified to only show event records for a single interface.

As shown in FIG. 3, the data table 300 includes columns for interface 302, source IP 304, source port 306, destination IP 308, destination port 310, protocol 312, action 314, bytes (or message size) 316, message type 318, and fingerprint 320. Data for each of these columns 302-320 is provided for six records or events 322-1, 322-2, 322-3, 322-4, 322-5, and 322-6 as shown in FIG. 3.

The message type 318 is determined for each event 322 based on the source port 306 and the destination port 310 in accordance with, for example, the logic table 200 as described herein. As shown, events 322-1, 322-3, and 322-5 are determined to be request events and are identified as Request 1, Request 2, and Request 3, respectively. As shown, the destination port 310 for each of the requests 322-1, 322-3, and 322-5 are identical while the source port 306 varies.

Events 322-2, 322-4, and 322-6 are determined to be response events and are identified as Response 1, Response 2, and Response 3, respectively. As shown, the source port 310 for each of the responses 322-2, 322-4, and 322-6 are identical while the destination port 306 varies.

As further shown, each event record 322 includes a fingerprint 320. The fingerprint 320 can be generated based on one or more of the identifying fields or columns of each event record 322, with any dynamic port excluded. As shown, the fingerprint 320 generated for event records 322-1, 322-3, and 322-5 are identical and the fingerprint 320 generated for event records 322-2, 322-4, and 322-6 are identical. As explained herein, data table 300 stores a record for each event within a data log flow in a bulky and cumbersome manner, generating a record for each separate event even if related to other events or duplicative thereof.

FIG. 4 illustrates a data table 400 generated by the VPC flow log stream aggregator 110. The data table 400 can be generated by the VPC flow log stream aggregator 110 based on the data provided within the data table 300 and can represent the aggregation and/or consolidation of records by the VPC flow log stream aggregator 110.

As shown, the data table 400 can include the same columns 302-314 and 318-320 as data table 300. The data table 400 also includes a total bytes column 402 and a count column 404. The total bytes 402 can be a sum of all bytes for all related or duplicate events as determined by the VPC flow log stream aggregator 110. The count column 404 can indicate a total number of events categorized together as related or duplicative.

In various embodiments, the VPC flow log stream aggregator 110 can consolidate the six event records 322 of data table 300 into two events 406-1 and 406-2. The events 406 can be considered to be aggregated or consolidate data flow log events or records. Event 406-1 summarizes data for related events 322-1, 322-3, and 322-5. As such, the total bytes column 402 includes a value that is a summation of the bytes data 316 for the events 322-1, 322-3, and 322-5. Further, the count column 404 for the event 406-1 indicates 3 records have been aggregated. The constant destination port 310 is stored with the event 406-1 as well as the last value of the dynamic source port 306 for the record 322-5, which is excluded from being used to generate the fingerprint.

Event 406-2 summarizes data for related events 322-2, 322-4, and 322-6. As such, the total bytes column 402 includes a value that is a summation of the bytes data 316 for the events 322-2, 322-4, and 322-6. Further, the count column 404 for the event 406-2 indicates 3 records have been aggregated. The constant source port 306 is stored with the event 406-2 as well as the last value of the dynamic destination port 310 for the record 322-6, which is excluded from being used to generate the fingerprint.

FIGS. 3 and 4 show how the VPC flow log stream aggregator 110 can recognize related or duplicative events within an aggregation time interval and can consolidate the related or duplicative events into fewer records while still retaining important information across all of the related or duplicative events. As an example, a client application in a monitored VPC that generates the VPC data flow log can make several requests to a server application in a short time period. Each of the requests and corresponding responses will generate log events. The destination server port will typically remain consistent across each event but the originating source port will be dynamic and will vary for each event. As a result, a separate record is created for each request or each response, although each request is related and each response is related. This, in turn, can result in the generation of very large numbers of records within an aggregation time window.

The VPC flow log stream aggregator 110 can improve the process of reviewing events within a VPC data flow log by recognizing related or duplicative events and consolidating them. As a result, fewer records are generated which can be further processed or reviewed in a more meaningful and helpful manner. As an example, with a one minute aggregation window, the VPC flow log stream aggregator 110 is capable of reducing the number of flow log records (e.g., compare data table 300 to data table 400) by 80%, while still retaining proper event counts, total message sizes (e.g., total byte counts), and other information helpful to retain for events.

When the aggregation window expires, the VPC flow log stream aggregator 110 can enrich each aggregated event record with additional metadata. In various embodiments, the VPC flow log stream aggregator 110 can store metadata with each aggregated event based on, for example, the source and destination IP addresses. The metadata can include, but is not limited to, the AWS account, subnet, VPC, region, resource type, and resource tags.

After aggregating events and enriching the generated aggregated event record with metadata, the aggregated and metadata enriched events can be written to an output Kinesis stream (e.g., the data stream 112) so that they can be read by consuming applications. Once the write is successful, the reader state is check-pointed. Overall, the aggregated and metadata enriched events can be stored in a data base (e.g., the database 116) for later lookup, review, and/or manipulation.

In various embodiments, the aggregated event records generated by the VPC flow log stream aggregator 110 can be used to detect VPC and/or communication traffic anomalies and/or security threats. For example, rejected requests and/or abnormal traffic flows can be detected and flagged for further scrutiny. In various embodiments, machine learning techniques or algorithms can be implemented to process the aggregated event records to detect anomalies or abnormal patterns of communication traffic activities in order to proactively identify and handle security threats or other issues.

Figure 5:
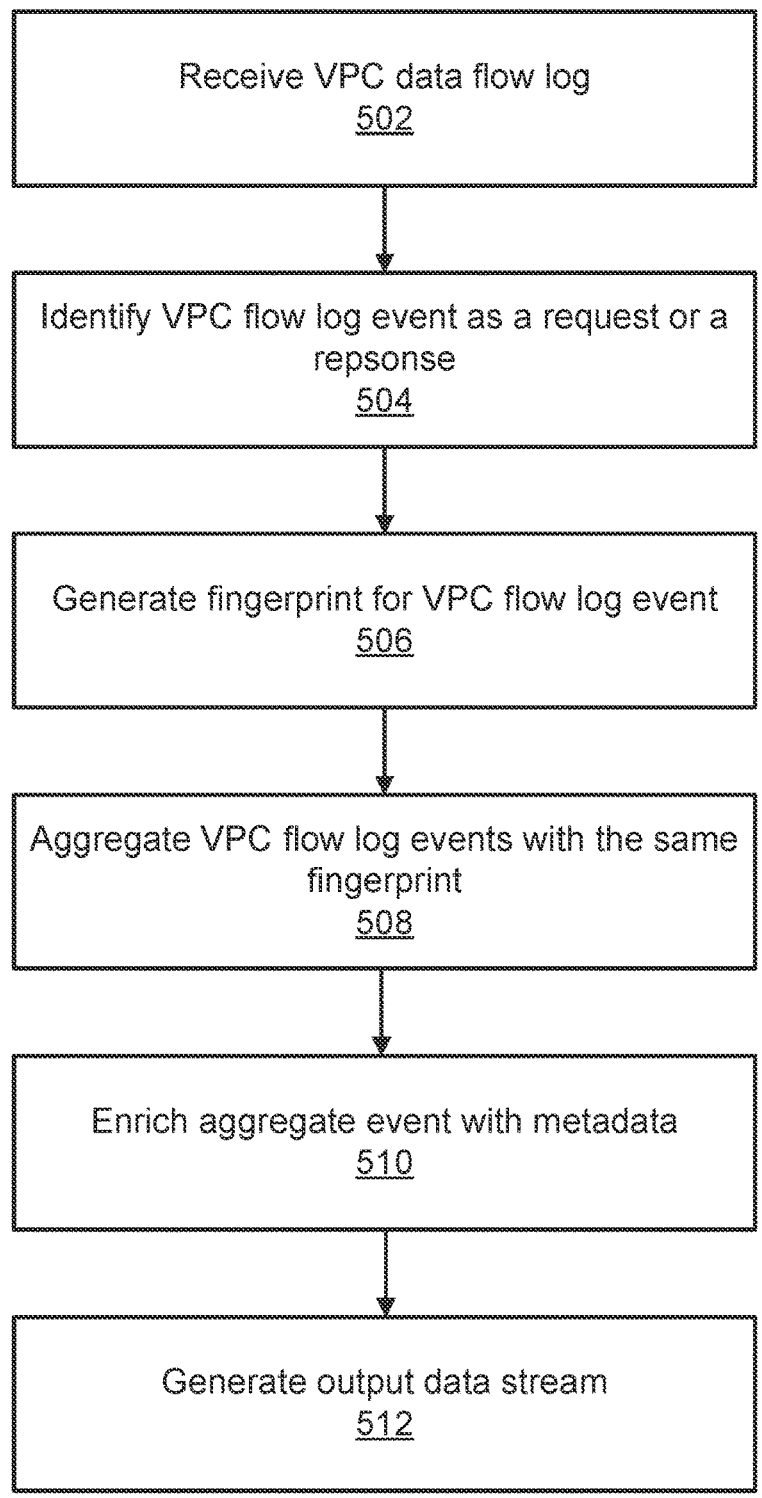
FIG. 5 illustrates a logic flow.

FIG. 5 illustrates an example of a logic flow 500 that may be representative of techniques for fingerprinting and aggregating a VPC flow log stream. For example, the logic flow 500 may be representative of operations that may be performed in various embodiments by any constituent component of the data processing arrangement 100 depicted in FIG. 1.

At 502, a VPC data flow log can be received. The VPC data flow log can include data or records related to multiple VPC data flow log events. In various embodiments, the a VPC data flow log event can be read from an input Kinesis stream and is parsed.

At 504, each VPC data flow log event can be identified as a "request" or a "response." In various embodiments, each VPC flow log event can be identified as a request or a response based on the logic table 200.

At 506, an event fingerprint can be generated for each VPC data flow log event. In various embodiments, a set of identifying fields from the log event can be concatenated and a base64 encoded MD5 sum can be generated to form the fingerprint. Based upon the request/response classification determined at 504, the dynamic port field can be excluded from the concatenated identifier. The generated fingerprint value can then be stored in the event as a top level attribute.

A 508, the VPC data flow log events can be aggregated by fingerprint to form, for example, aggregated events or event records. In various embodiments, a VPC data flow log event is stored in an in-memory dictionary by fingerprint with an initial event count of 1. If the fingerprint already exists in the dictionary, the event count can be incremented and the event message size field (e.g., "bytes" field) is summed with the new event message size field. The most recent timestamp can also be retained for the event.

At 510, the aggregated event can be enriched with metadata. A variety of additional metadata can be stored in relation to the unique fingerprint for the aggregated event.

At 512, the aggregated events can be written to an output data stream. The output data stream can then be provided to a database for storage and/or to a database manipulator application for further processing or manipulation. In various embodiment, the logic flow 500 can be repeated for each aggregation time window, which can vary in duration based on user selection.

FIG. 6 illustrates a storage medium 600. Storage medium 600 may represent an implementation of a storage device of any constituent component of the data processing arrangement 100 depicted in FIG. 1. The storage medium 600 can comprise any non-transitory computer-readable storage medium or machine-readable storage medium. In various embodiments, the storage medium 600 can comprise a physical article of manufacture. In various embodiments, storage medium 600 can store computer-executable instructions, such as computer-executable instructions to implement one or more of logic flows or operations described herein, such as the logic flow 500 of FIG. 5.

In various embodiments, storage medium 600 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 7:
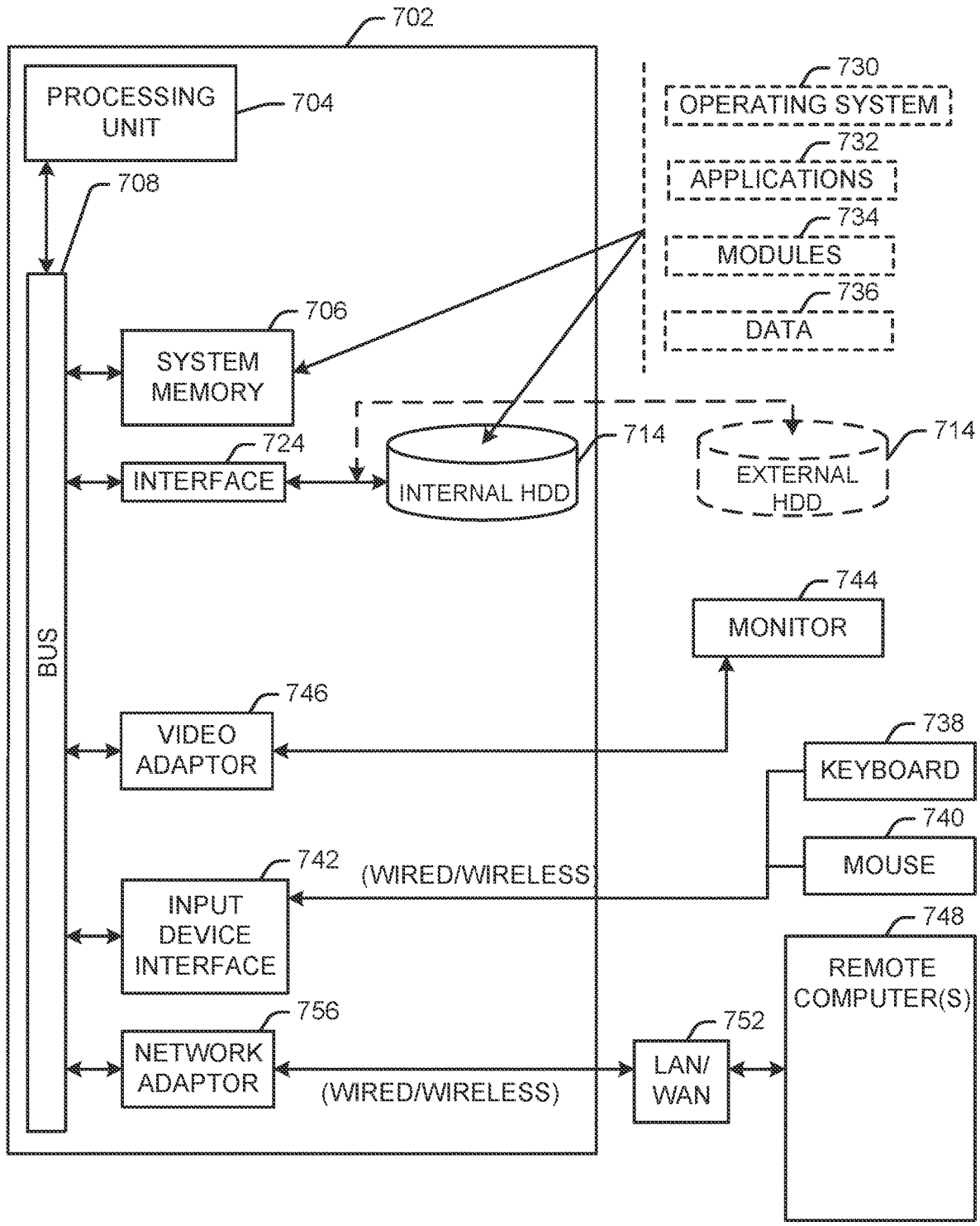
FIG. 7 illustrates a computing architecture.

FIG. 7 illustrates a computing architecture 700 that can implement various embodiments described herein. In various embodiments, the computing architecture 700 can comprise or be implemented as part of an electronic device and/or a computing device. In various embodiments, the computing architecture 700 can represent an implementation of any constituent component of the data processing arrangement 100 depicted in FIG. 1 including, for example, the VPC flow log stream aggregator 110. One or more of the constituent components of the computing architecture 700, and/or any constituent component of the data processing arrangement 100, can be implemented in hardware, software, or any combination thereof including implementation based on a storage device (e.g., a memory unit) and logic, at least a portion of which is implemented in circuitry and coupled to the storage device. The logic can be or can include a processor or controller component.

The computing architecture 700 can include various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth.

As shown in FIG. 7, the computing architecture 700 can comprise a computer 702 having a processing unit 704, a system memory 706 and a system bus 708. The processing unit 704 can be any of various commercially available processors or can be a specially designed processor.

The system bus 708 provides an interface for system components including, but not limited to, an interface between the system memory 706 and the processing unit 704. The system bus 708 can be any of several types of bus structure that may further interconnect to a memory bus (with or without a memory controller), a peripheral bus, and a local bus using any of a variety of commercially available bus architectures.

The system memory 706 can include any type of computer-readable storage media including any type of volatile and non-volatile memory. The computer 702 can include any type of computer-readable storage media including an internal (or external) hard disk drive (HDD) 714. In various embodiments, the computer 702 can include any other type of disk drive such as, for example, a magnetic floppy disk and/or an optical disk drive. The HDD 714 can be connected to the system bus 708 by a HDD interface 724.

In various embodiments, any number of program modules can be stored in the drives and memory units 706 and/or 714 such as, for example, an operating system 730, one or more application programs 732, other program modules 734, and program data 736.

A user can enter commands and information into the computer 702 through one or more wired/wireless input devices such as, for example, a keyboard 738 and a pointing device, such as a mouse 740. These and other input devices can be connected to the processing unit 704 through an input device interface 742 that is coupled to the system bus 708. A monitor 744 or other type of display device can also be connected to the system bus 708 via an interface, such as a video adaptor 746. The monitor 744 may be internal or external to the computer 702

The computer 702 may operate in a networked environment using logical connections via wired and/or wireless communications to one or more remote computers, such as a remote computer 748. The remote computer 748 can be a workstation, a server computer, a router, a personal computer, portable computer, microprocessor-based entertainment appliance, a smartphone, a tablet, a peer device or other common network node, and typically includes many or all of the elements described relative to the computer 702. The logical connections depicted include wired and/or wireless connectivity to networks 752 such as, for example, a local area network (LAN) and/or larger networks, for example, a wide area network (WAN). Networks 752 can provide connectivity to a global communications network such as, for example, the Internet. A network adapter 756 can facilitate wired and/or wireless communications to the networks 752. The computer 702 is operable to communicate over any known wired or wireless communication technology, standard, or protocol according to any known computer networking technology, standard, or protocol.

Figure 8:
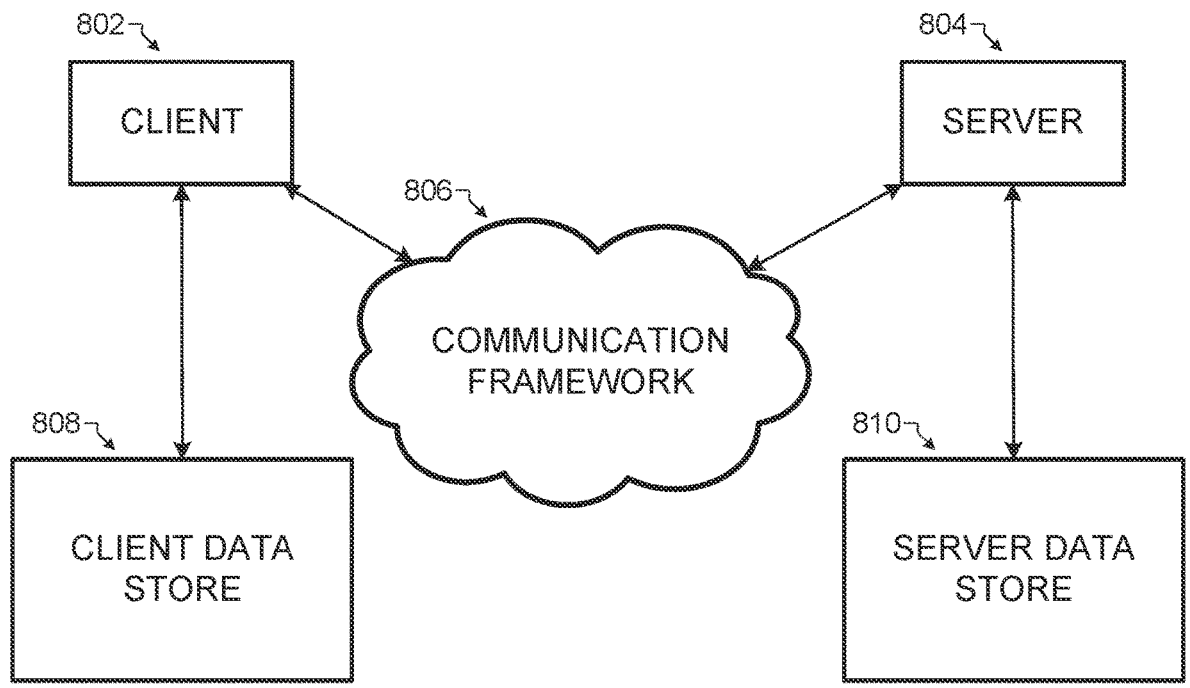
FIG. 8 illustrates a communication architecture.

FIG. 8 illustrates a block diagram of a communication architecture 800. The communication architecture 800 can implement various embodiments described herein. As shown in FIG. 8, the communication architecture 800 comprises one or more clients 802 and servers 804. One of the clients 802 and/or one of the servers 804 can represent any constituent component of the data processing arrangement 100 depicted in FIG. 1.

The client 802 and the server 804 can be operatively connected to a client data store 808 and a server data store 810, respectively, that can be employed to store information local to the respective client 802 and server 804. In various embodiments, the client 802 and/or the server 804 can implement one or more of logic flows or operations described herein.

The client 802 and the server 804 can communicate data or other information between each other using a communication framework 806. The communications framework 806 can implement any known communications technique or protocol. The communications framework 806 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 806 can operate over any communication media according to any networking technology including any wired or wireless communications standard or protocol, or any combination thereof.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A method, comprising:
accessing a first data flow log event in a data flow log;
determining whether the first data flow log event is a request event or a response event by determining whether a first port value is above or below a predetermined threshold or whether a second port value is above or below the predetermined threshold;
generating an identifier for the first data flow log event based on the first data flow log event being the request event or the response event; and
incrementing an event count associated with the identifier.

2. The method of claim 1, further comprising:
incrementing a byte count associated with the identifier based on a number of bytes associated with the first data flow log event.

3. The method of claim 1, further comprising:
determining that a second data flow log event in the data flow log is associated with the identifier.

4. The method of claim 3, further comprising:
consolidating the first and second data flow log events in the data flow log based on the first and second data flow log events being associated with the identifier.

5. The method of claim 3, further comprising:
displaying the consolidated first and second data flow log events in the data flow log.

6. The method of claim 1, wherein the identifier comprises a fingerprint, wherein the fingerprint is based on hashing one or more of: a client interface identifier of the first data flow log event, a source address of the first data flow log event, a destination address of the first data flow log event, a communication protocol identifier of the first data flow log event, an action identifier of the first data flow log event, the first port value, and the second port value.

7. The method of claim 1, wherein a first one of the first port value and the second port value is a source port value, wherein a second one of the first port value and the second port value is a destination port value.

8. A non-transitory computer-readable storage medium, the computer-readable storage medium including instructions that when executed by a processor, cause the processor to:
   access a first data flow log event in a data flow log;
   determine whether the first data flow log event is a request event or a response event by determining whether a first port value is above or below a predetermined threshold or whether a second port value is above or below the predetermined threshold;
   generate an identifier for the first data flow log event based on the first data flow log event being the request event or the response event; and
   increment an event count associated with the identifier.

9. The computer-readable storage medium of claim 8, wherein the instructions further cause the processor to:
   increment a byte count associated with the identifier based on a number of bytes associated with the first data flow log event.

10. The computer-readable storage medium of claim 8, wherein the instructions further cause the processor to:
    determine that a second data flow log event in the data flow log is associated with the identifier.

11. The computer-readable storage medium of claim 10, wherein the instructions further cause the processor to:
    consolidate the first and second data flow log events in the data flow log based on the first and second data flow log events being associated with the identifier.

12. The computer-readable storage medium of claim 10, wherein the instructions further cause the processor to:
    display the consolidated first and second data flow log events in the data flow log.

13. The computer-readable storage medium of claim 8, wherein the identifier comprises a fingerprint, wherein the fingerprint is based on hashing one or more of: a client interface identifier of the first data flow log event, a source address of the first data flow log event, a destination address of the first data flow log event, a communication protocol identifier of the first data flow log event, an action identifier of the first data flow log event, the first port value, and the second port value.

14. The computer-readable storage medium of claim 8, wherein a first one of the first port value and the second port value is a source port value, wherein a second one of the first port value and the second port value is a destination port value.

15. A computing apparatus comprising:
    a processor; and
    a memory storing instructions that, when executed by the processor, cause the processor to:
    access a first data flow log event in a data flow log;
    determine whether the first data flow log event is a request event or a response event by determining whether a first port value is above or below a predetermined threshold or whether a second port value is above or below the predetermined threshold;
    generate an identifier for the first data flow log event based on the first data flow log event being the request event or the response event; and
    increment an event count associated with the identifier.

16. The computing apparatus of claim 15, wherein the instructions further cause the processor to:
    increment a byte count associated with the identifier based on a number of bytes associated with the first data flow log event.

17. The computing apparatus of claim 15, wherein the instructions further cause the processor to:
    determine that a second data flow log event in the data flow log is associated with the identifier.

18. The computing apparatus of claim 17, wherein the instructions further cause the processor to:
    consolidate the first and second data flow log events in the data flow log based on the first and second data flow log events being associated with the identifier.

19. The computing apparatus of claim 17, wherein the instructions further cause the processor to:
    display the consolidated first and second data flow log events in the data flow log.

20. The computing apparatus of claim 15, wherein the identifier comprises a fingerprint, wherein the fingerprint is based on hashing one or more of: a client interface identifier of the first data flow log event, a source address of the first data flow log event, a destination address of the first data flow log event, a communication protocol identifier of the first data flow log event, an action identifier of the first data flow log event, the first port value, and the second port value.

* * * * *